UNITED STATES PATENT OFFICE.

BISHIP PURCELL, OF PORTAGEVILLE, MISSOURI.

METHOD OF WELDING METALS.

SPECIFICATION forming part of Letters Patent No. 682,815, dated September 17, 1901.

Application filed January 5, 1901. Serial No. 42,204. (No specimens.)

*To all whom it may concern:*

Be it known that I, BISHIP PURCELL, a citizen of the United States, residing at Portageville, in the county of New Madrid and State of Missouri, have invented certain new and useful Improvements in Methods of Welding Metals; and I do hereby declare the following to be a full, clear, and exact description of the invention, such as will enable others skilled in the art to which it appertains to make and use the same.

This invention relates to methods of welding metals by heat; and it consists in adding to the fire a chemical substance, as hereinafter fully described and claimed.

In carrying out this invention a fire is made of any approved fuel on a blacksmith's hearth in the usual way, and the metals are prepared for welding in any approved manner. Sulfur is sprinkled into the fire before the metals are placed in the fire for the purpose of being brought to the welding heat. Common sulfur or brimstone is used, and it is preferably used in the form of powder. The sulfur is added to the fire and is stirred into it if necessary. Its action appears to be to clean the fire or the metals, or both of them, of something, such as impurities, which usually makes welding difficult. A heaping tablespoonful of sulfur will usually suffice for one welding operation. The sulfur is not applied to or placed on the metals, as the direct application of sulfur to the metals will not effect the desired result, the beneficial effect of the sulfur being obtained by treating the fire with it before placing the metals in the fire.

By first treating the fire with sulfur before bringing the metals to the welding heat copper, brass, and other metals can be welded as well as iron and steel. When steel is welded, borax can be used as a flux in the ordinary way, and the use of sulfur in the fire does not necessitate a change of the other steps of the ordinary method of welding metals as performed by blacksmiths.

I do not confine myself to the use of pure sulfur in carrying out this invention, as I may use its chemical equivalents in the process, such as chemical compounds of sulfur, which will accomplish the same result, or I may use mixtures of various substances in which sulfur is the active agent.

What I claim is—

A step in the process of welding metals, which consists in first sprinkling powdered sulfur into the fire, and subsequently placing the metals in the said fire and bringing them to a welding heat, substantially as set forth.

In testimony whereof I affix my signature in presence of two witnesses.

BISHIP PURCELL.

Witnesses:
JONAH DE LISLE,
CHAS. A. MCDONALD.